(12) United States Patent
Wang et al.

(10) Patent No.: US 10,964,030 B2
(45) Date of Patent: Mar. 30, 2021

(54) DEVICE AND METHOD WITH POSE ESTIMATOR BASED ON CURRENT PREDICTED MOTION STATE ARRAY

(71) Applicant: Samsung Electronics Co., Ltd., Suwon-si (KR)

(72) Inventors: Guangwei Wang, Beijing (CN); Tianhao Gao, Beijing (CN); Chun Wang, Beijing (CN); GeeYoung Sung, Daegu (KR); Hong-Seok Lee, Seoul (KR); Lin Ma, Beijing (CN); Minsu Ahn, Yongin-si (KR); Qiang Wang, Beijing (CN); Sunghoon Hong, Suwon-si (KR); Yun-Tae Kim, Suwon-si (KR); Zhihua Liu, Beijing (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 270 days.

(21) Appl. No.: 16/114,622

(22) Filed: Aug. 28, 2018

(65) Prior Publication Data

US 2019/0251696 A1    Aug. 15, 2019

(30) Foreign Application Priority Data

Feb. 12, 2018   (CN) .......................... 201810148359.1
May 2, 2018   (KR) .......................... 10-2018-0050747

(51) Int. Cl.
*G06T 7/292* (2017.01)
*G06T 19/00* (2011.01)
(Continued)

(52) U.S. Cl.
CPC .............. *G06T 7/246* (2017.01); *G01P 15/18* (2013.01); *G02B 27/017* (2013.01); *G06T 7/292* (2017.01);
(Continued)

(58) Field of Classification Search
None
See application file for complete search history.

(56) References Cited

U.S. PATENT DOCUMENTS 7,610,182 B2 * 10/2009 Smith ..................... G06F 30/20
703/2
9,041,622 B2    5/2015 McCulloch et al.
(Continued)

FOREIGN PATENT DOCUMENTS

KR    10-2013-0126623 A    11/2013
KR    10-2015-0092165 A    8/2015
(Continued)

OTHER PUBLICATIONS

Xing et al., "Angular velocity fusion of the microelectromechanical system inertial measurement unit array based on extended Kalman filter with correlated system noises" May 26, 2020, Sage Journals https://journals.sagepub.com/doi/full/10.1177/0020294020917702, https://doi.org/10.1177/0020294020917702 (Year: 2020).*

*Primary Examiner* — Tahmina N Ansari
(74) *Attorney, Agent, or Firm* — NSIP Law

(57) ABSTRACT

A method and device that estimate a pose of a device and the device are disclosed. The method may include generating inertial measurement unit (IMU) data of the device, determining a first pose of the device a first time point based on the IMU data, generating a current predicted motion state array based on the IMU data, and estimating an M-th predicted pose of the device at an M-th time point after the first time point based on the current predicted motion state array, where M denotes a natural number greater than 1.

19 Claims, 19 Drawing Sheets

(51) Int. Cl.
*G06T 7/73* (2017.01)
*G06T 7/246* (2017.01)
*G01P 15/18* (2013.01)
*G02B 27/01* (2006.01)

(52) U.S. Cl.
CPC .... *G06T 19/006* (2013.01); *G02B 2027/0174* (2013.01); *G02B 2027/0187* (2013.01); *G06T 7/74* (2017.01); *G06T 2207/30244* (2013.01)

(56) References Cited

U.S. PATENT DOCUMENTS

| | | |
|---|---|---|
| 9,210,413 B2 | 12/2015 | Grinberg et al. |
| 2012/0303255 A1* | 11/2012 | Wong .................. G05D 1/0274 701/300 |
| 2017/0206668 A1* | 7/2017 | Poulos ............... G06K 9/00832 |
| 2017/0206712 A1* | 7/2017 | Petrovskaya ........... G06F 1/163 |
| 2019/0251696 A1* | 8/2019 | Wang .................. G02B 27/017 |

FOREIGN PATENT DOCUMENTS

| | | |
|---|---|---|
| KR | 10-2015-0123226 A | 11/2015 |
| KR | 10-2016-0048801 A | 5/2016 |
| KR | 10-2017-0018930 A | 2/2017 |
| KR | 10-1732890 B1 | 5/2017 |

\* cited by examiner

US 10,964,030 B2

DEVICE AND METHOD WITH POSE ESTIMATOR BASED ON CURRENT PREDICTED MOTION STATE ARRAY

CROSS-REFERENCE TO RELATED APPLICATIONS

This application claims the benefit under 35 USC § 119(a) of Chinese Patent Application No. 201810148359.1 filed on Feb. 12, 2018, in the State Intellectual Property Office of the P.R.C. and Korean Patent Application No. 10-2018-0050747 filed on May 2, 2018, in the Korean Intellectual Property Office, the entire disclosures of which are incorporated herein by reference for all purposes.

BACKGROUND

1. Field

The following description relates to a device and method with a pose estimator, and more particularly, to a device and method with a pose estimator using an inertial measurement unit (IMU).

2. Description of Related Art

Display technologies such as virtual reality (VR) displays and augmented reality (AR) displays may enable a user to feel an output image as if it is real. Through such technologies, a user may experience computer-generated perceptual information with the physical world in an immersive environment. For an image to be provided to a user through the VR or AR display, the real-time property of the image may be an important factor. For an output image to closely mimic a user's pose, detecting an exact current pose of the user may be desired. In this case, when the output image lags a real-time pose, the user may experience inconvenience due to an error between the pose of the user and the output image, and represents a technological failing of the underlying device and the system.

In situations where a wearable device is used to detect a pose of a user, a tight coupling method is used to detect the pose of the device using many sensors may be relatively highly accurate. However, such tight coupling method may result in delay because of calculations and/or computations complexity due to the amount of data and many constraints to be considered.

SUMMARY

This Summary is provided to introduce a selection of concepts in a simplified form that is further described below in the Detailed Description. This Summary is not intended to identify key features or essential features of the claimed subject matter, nor is it intended to be used as an aid in determining the scope of the claimed subject matter.

An aspect provides a method of estimating a position of a device, and the device.

Another aspect also provides a method of estimating a position of a device using a loose coupling method, and the device.

In one general aspect, a processor-implemented method of estimating a pose of a device to be performed by the device includes generating, using an inertial measurement unit (IMU) of the device, IMU data, determining a first pose of the device based on the IMU data, generating a current predicted motion state array based on the IMU data, and estimating an M-th predicted pose of the device at an M-th time point after a first time point of the first pose based on the current predicted motion state array.

The generating of the current predicted motion state array may include smoothing the IMU data, generating a first motion state vector at the first time point based on the smoothed IMU data, determining an N-th predicted motion state vector at an N-th time point based on the first motion state vector, and generating the current predicted motion state array based on a motion model, a previous predicted motion state array, and the N-th predicted motion state vector.

The generating of the first motion state vector may include generating the first motion state vector by correcting the smoothed IMU data based on a difference between the first pose and a first predicted pose that is estimated in advance.

The determining of the N-th predicted motion state vector may include generating the N-th predicted motion state vector using a long-short-term memory (LSTM)-type recurrent neural network (RNN) using the first motion state vector as input.

The generating of the first motion state vector may include determining a frequency of generation of the first motion state vector based on at least one of ocular movement velocity of a user of the device or a head movement velocity of the user.

The method may further include determining whether the device is in a static state based on the IMU data. The determining of the first pose of the device may include determining the first pose based on whether the device is in the static state.

The method may further include generating a virtual object to be output at the M-th time point, and outputting the virtual object.

The method may further include adjusting the virtual object based on a pose change of the device occurring during a period for rendering of the virtual object.

The outputting of the virtual object may include outputting the virtual object such that an image at the M-th time point and the virtual object are synthesized.

The virtual object may be a holographic image.

The method may further include generating a map of a space around the device, determining an initial pose of the device using the generated map, and determining whether the device is in a static state based on the IMU data. The first pose may be determined when the device is in the static state.

The generating of the map may include generating a left image using a left camera of the device, generating one or more first feature points from the left image, generating a right image using a right camera of the device, generating one or more second feature points from the right image, matching the first feature points and the second feature points, and generating the map based on matched feature points and unmatched feature points between the first feature points and the second feature points.

The determining of the initial pose may include generating one or more feature points from an image generated by at least one of the left camera or tje right camera of the device, determining a target feature point corresponding to the one or more feature points among preset candidate feature points in the map, and determining the initial pose based on the target feature point.

The determining of the initial pose may further include determining a remaining feature point that does not correspond to the preset candidate feature points in the map among the one or more feature points, and updating the map by adding, to the map, a feature point corresponding to the remaining feature point.

The device may be a wearable device.

In another general aspect, a device for estimating a pose of the device includes at least one camera, an inertial measurement unit (IMU), and a processor. The processor is configured to generate IMU data using the IMU of the device; determine a first pose of the device based on the IMU data; generate a current predicted motion state array based on the IMU data; estimate an M-th predicted pose at an M-th time point after a first time point of the first pose based on the current predicted motion state array, wherein M denotes a natural number greater than 1.

The device may further include a memory storing instructions, which when executed by the processor, cause the processor to implement the generation of the IMU data, the determination of the first pose, the generation of the current predicted motion state array, and the estimation of the M-th predicted pose.

In another general aspect, a processor-implemented method including determining a first pose of a device based on an inertial measurement unit (IMU) data at a first time point; generating a current predicted motion state array based on the IMU data; and estimating a second pose of the device at a second time point after the first time point based on the current predicted motion state array; generating a virtual object to be output at the second time point; and outputting the virtual object.

The generating of the current predicted motion state array may include generating a first motion state vector at the first time point based on the IMU data; determining a predicted motion state vector at a third time point based on the first motion state vector; and generating the current predicted motion state array based on a motion model, a previous predicted motion state array, and the predicted motion state vector.

Other features and aspects will be apparent from the following detailed description, the drawings, and the claims.

Figure 1:
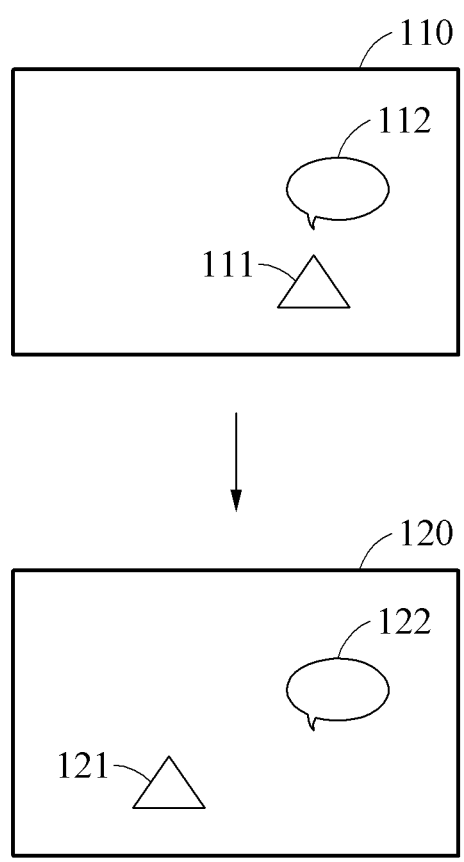
FIG. 1 is a diagram illustrating an example of an image to which a virtual object is output.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known after an understanding of the disclosure of this application may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Unless otherwise defined, all terms, including technical and scientific terms, used herein have the same meaning as commonly understood by one of ordinary skill in the art to which this disclosure pertains and in view of the discussion of this application. Terms, such as those defined in commonly used dictionaries, are to be interpreted as having a meaning that is consistent with their meaning in the context of the relevant art and the disclosure of this application, and are not to be interpreted in an idealized or overly formal sense unless expressly so defined herein.

Also, in the description of example embodiments, detailed description of structures or functions that are thereby known after an understanding of the disclosure of the present application will be omitted when it is deemed that such description will cause ambiguous interpretation of the example embodiments.

FIG. 1 is a diagram illustrating an example of an image to which a virtual object is output.

Referring to FIG. 1, a first image 110 includes a real object 111 and a virtual object 112. The virtual object 112 may be additional information of the real object 111. A position of the virtual object 112 in the first image 110 may be determined based on a gaze of a user and a position of the real object 111.

When the gaze of the user changes, the first image 110 changes to a second image 120. The second image 120 includes a real object 121 corresponding to the real object 111 of the first image 110 and a virtual object 122 corresponding to the virtual object 112 of the first image 110. A position of the real object 121 in the second image 120 may be obtained immediately from the change of the gaze of the user. However, when the gaze of the user is not detected immediately, the position of the virtual object 112 may be determined to be a position of the virtual object 122 in the second image 120 without a change in position. Thus, the position of the virtual object 122 relative to the position of the real object 121 in the second image 120 may not be desirable or accurately depicted.

In an example, it is possible to detect a gaze of a user by determining a pose of a device corresponding to the gaze of the user. The pose of the device may be determined or estimated through sensors of the device. Hereinafter, how a pose of a device is estimated will be described in greater detail with reference to FIGS. 2 through 18.

Herein, a term "pose" indicates a current pose that is determined using currently measured data, and a term "predicted pose" indicates a future pose that is estimated using currently measured data.

Figure 2:
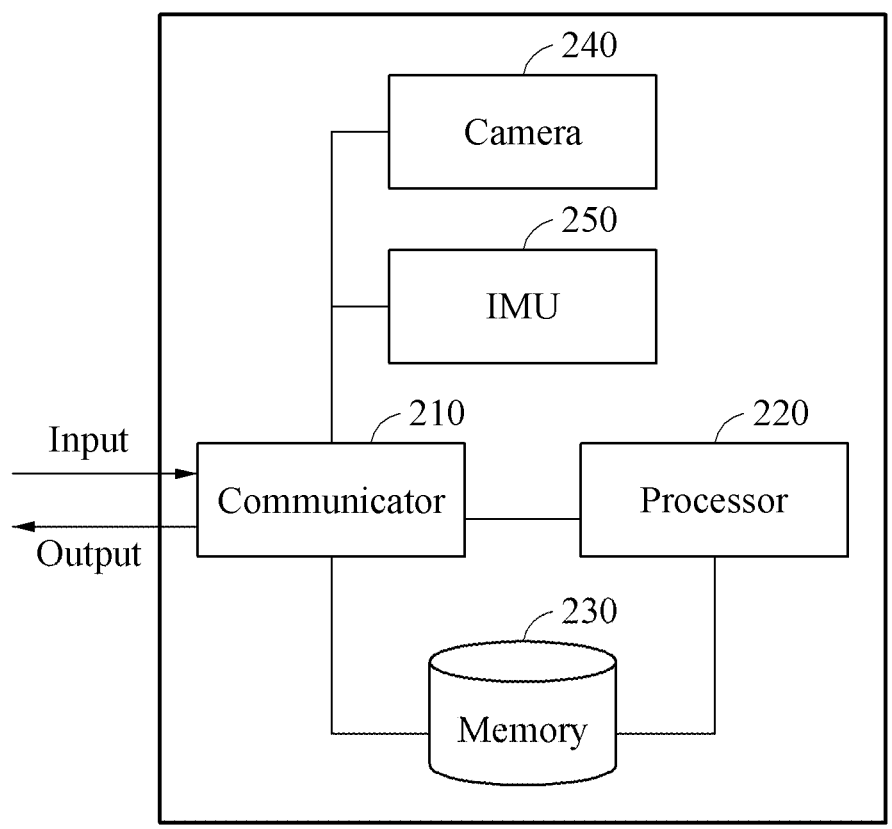
FIG. 2 is a diagram illustrating an example of a device.

FIG. 2 is a diagram illustrating an example of a device.

Referring to FIG. 2, a device 200 may include a communicator 210, a processor 220, a memory 230, a camera 240, and an inertial measurement unit (IMU) 250, as a non-limiting example. The device 200 may be an electronic device. The device 200 may be, for example, a device configured to output an image used to provide a user with virtual reality (VR) or augmented reality (AR). In an example, the device 200 may be a wearable device. The device 200 may be, for example, a type of eyeglasses or a head-mounted display (HMD). However, examples of the device 200 are not limited to the examples described in the foregoing. In another example, the device 200 may be used to track or estimate a location of the user. In still another example, the device 200 may also be used for autonomous or automated driving.

Herein, it is noted that use of the term 'may' with respect to an example or embodiment, e.g., as to what an example or embodiment may include or implement, means that at least one example or embodiment exists where such a feature is included or implemented while all examples and embodiments are not limited thereto.

The communicator 210 may be connected to the processor 220, the memory 230, the camera 240, and the IMU 250 to transmit and/or receive data. The communicator 210 may also be connected to another external device to transmit and/or receive data.

A circuitry may embody the communicator 210 in the device 200. For example, the communicator 210 may include an internal bus and an external bus. Alternatively, the communicator 210 may be another hardware element to connect the device 200 and an external device. The communicator 210 may be an interface, for example. The communicator 210 may receive data from the external device, and transmit the data to the processor 220 and the memory 230.

The processor 220 may process data received by the communicator 210 and data stored in the memory 230. Herein, the term "processor" indicates a data processing device embodied by hardware including a circuit of a physical structure to perform or execute desired operations. The desired operations may include, for example, a code or instructions included in a program. The data processing device embodied by hardware may include, for example, a microprocessor, a central processing unit (CPU), a processor core, a multicore processor, a multiprocessor, an application-specific integrated circuit (ASIC), a field-programmable gate array (FPGA), and the like.

The processor 220 may execute a computer-readable code, for example, software, stored in a memory, for example, the memory 230, and instructions initiated by the processor 220.

The memory 230 may store data received by the communicator 210 and data processed by the processor 220. For example, the memory 230 may store the program. The stored program may be a set of syntaxes that are encoded to estimate a pose of the device 200 and executed by the processor 220.

In an example, the memory 230 may include at least one volatile memory, nonvolatile memory, random access memory (RAM), flash memory, hard disk drive, and optical disc drive.

The memory 230 may store an instruction set, for example, software, to operate the device 200. The instruction set operating the device 200 may be executed by the processor 220.

The camera 240 may generate an image by capturing a scene. For example, the camera 240 may include a left camera configured to generate a left image to be output to a left eye of the user, and a right camera configured to generate a right image to be output to a right eye of the user. In this example, there is a binocular disparity between the left image and the right image. For another example, the camera 240 may generate a single image and the processor 220 may generate a left image and a right image using an image processing method such as, for example, image warping.

The IMU 250 may generate IMU data by measuring acceleration and an angular velocity of a movement of the device 200.

The device 200 may also include sensors configured to measure a position or a pose of the device 200. For example, the device 200 may include a global positioning system (GPS) further represented by the communicator 210, but examples are not limited to the foregoing.

The communicator 210, the processor 220, the memory 230, the camera 240, and the IMU 250 will be described in greater detail with reference to FIGS. 3 through 18.

Figure 3:
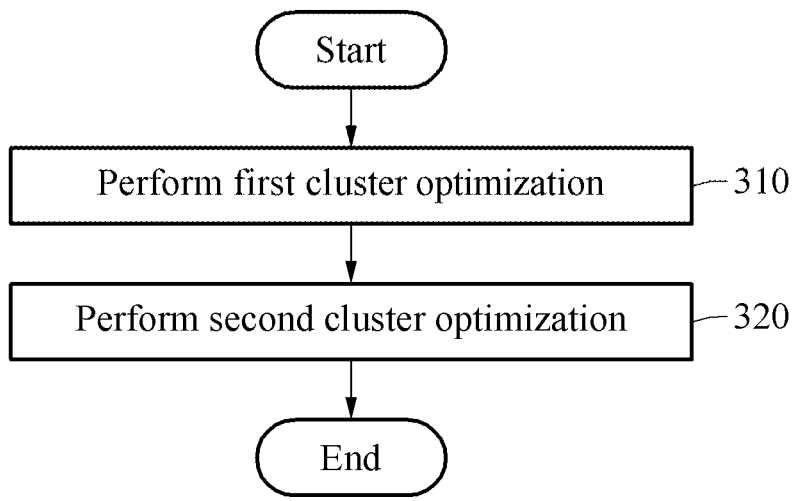
FIG. 3 is a flowchart illustrating an example of a cluster optimization method to estimate a pose of a device.

FIG. 3 is a flowchart illustrating an example of a cluster optimization method to estimate a pose of a device.

Referring to FIG. 3, to estimate a pose of the device 200, operation 310 of first cluster optimization and operation 320 of second cluster optimization are performed. Herein, the term "cluster optimization" indicates optimizing a parameter and an algorithm to be used to estimate a pose of the device 200.

Operation 310 of the first cluster optimization may be performed using a tight coupling cluster optimization method. The tight coupling optimization method may be performed to estimate a pose of the device 200 using data measured by a relatively greater number of sensors, i.e., the tight coupling method uses more sensors than a loose coupling cluster optimization method. For example, an image generated using the camera 240 and IMU data generated using the IMU 250 may be used to estimate a pose of the device 200. Operation 310 of the first cluster optimization will be described in greater detail with reference to FIGS. 4 through 8.

Operation 320 of the second cluster optimization may be performed using a loose coupling cluster optimization method. The loose coupling cluster optimization method may be performed to estimate a pose of the device 200 using data measured by a relatively less number of sensors. For example, in an example, only the IMU data generated using the IMU 250 may be used to estimate a pose of the device 200. The IMU data may include information on acceleration and an angular velocity of the device 200, and it is thus possible to determine a current pose of the device 200 by integrating the IMU data and overlapping a value obtained through the integration and a previous pose.

As the number of sets of data used to estimate a pose decrease, the pose may be more rapidly estimated. Operation 320 of the second cluster optimization will be described in greater detail with reference to FIGS. 9 through 15.

Figure 4:
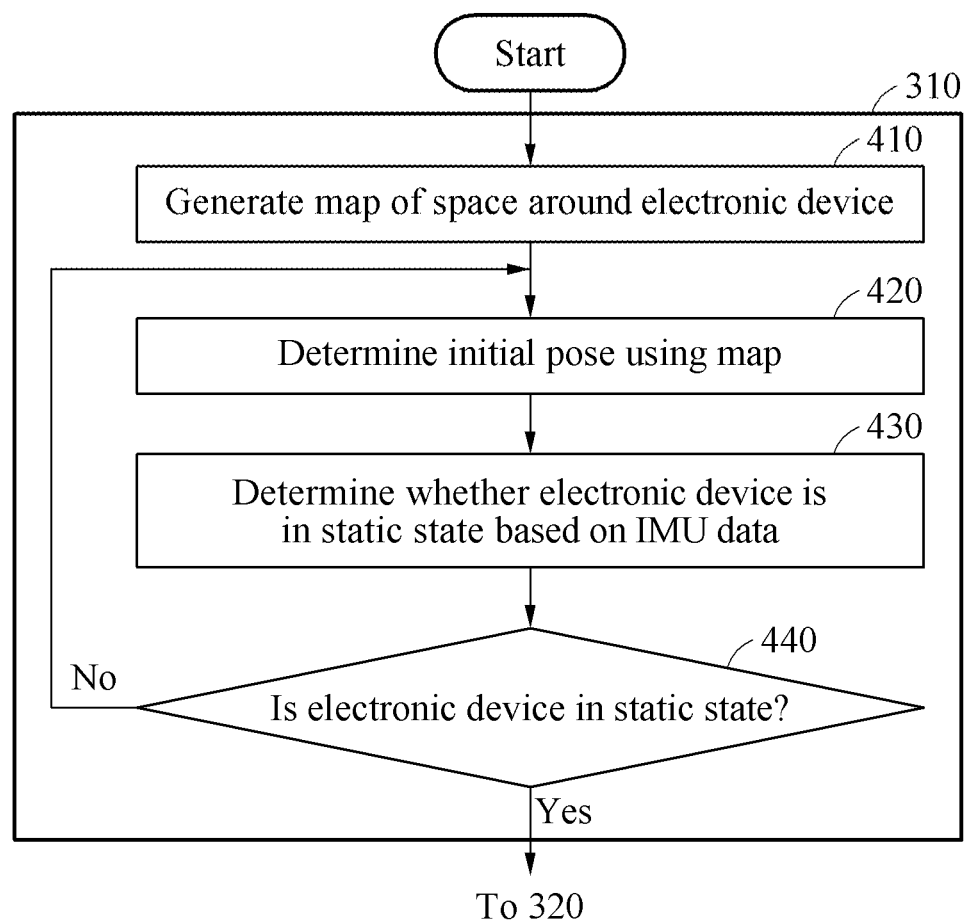
FIG. 4 is a flowchart illustrating an example of a first cluster optimization method.

FIG. 4 is a flowchart illustrating an example of a first cluster optimization method.

Operation 310 described above with reference to FIG. 3 may include operations 410 through 440 to be described hereinafter with reference to FIG. 4, although example are not limited thereto.

Referring to FIG. 4, in operation 410, the device 200 generates a map of a space around the device 200. The device 200 may generate the map using images captured by the camera 240. The generation of the map will be described in greater detail with reference to FIG. 5.

In operation 420, the device 200 determines an initial pose of the device 200 using the map. The determination of the initial pose will be described in greater detail with reference to FIG. 6.

In operation 430, the device 200 determines whether the device 200 is in a static state based on IMU data. The static state may indicate a state in which there is no movement of the device 200, or there is a movement of the device 200 with a value of the movement being less than or equal to a preset threshold value.

The IMU data may generally include noise, which may cause an error in estimating a pose of the device 200. However, based on whether the device 200 is in the static state, or a stationary state, to estimate a pose of the device 200, it is possible to reduce an influence of such noise. Whether the device 200 is in the static state may be determined by analyzing a local change of the IMU data. In response to a determination that the device 200 is in the static state, a constraint may be added to increase accuracy in estimating a pose of the device 200 when performing a cluster optimization at a next time point. The constraint may include, for example, a constraint that i) a position of the device 200 may be obtained based on a spatial position of a map point, for example, a three-dimensional (3D) position, and a position of a feature point of an image, for example, a left image and/or a right image, corresponding to the spatial position of the map point; ii) a position of a new map point in a space may be calculated by a position of the device 200 and a position of a feature point in an image corresponding to the new map point; iii) a position and a pose of the device 200 in a preceding image and a subsequent image may be calculated based on IMU data and IMU parameters between the preceding image and the subsequent image (herein, the IMU parameters may be motion state vectors); iv) the IMU parameters may be calculated using IMU data among a plurality of images and a pose of the device 200 corresponding to the images; and/or v) based on a detected static state, a pose between two images may be determined to change to 0.

Since there are the constraints associated with a relationship among a map point, a pose of the device 200, and the IMU data, a pose of the device 200 that substantially or maximally satisfies the constraints may be determined. For example, when a greater number of the constraints is satisfied, the pose may be more accurately estimated, although estimated relatively more slowly.

In operation 440, the device 200 determines whether to re-perform the first cluster optimization or perform the second cluster optimization based on a determined state of the device 200.

Through operation 310 of the first cluster optimization, a parameter and an algorithm to be used to estimate a pose of the device 200 may be optimized in operation 320 of the second cluster optimization. The parameter and the algorithm to be used to estimate a pose in operation 320 of the second cluster optimization will be described in greater detail with reference to FIGS. 10 through 13.

Figure 5:
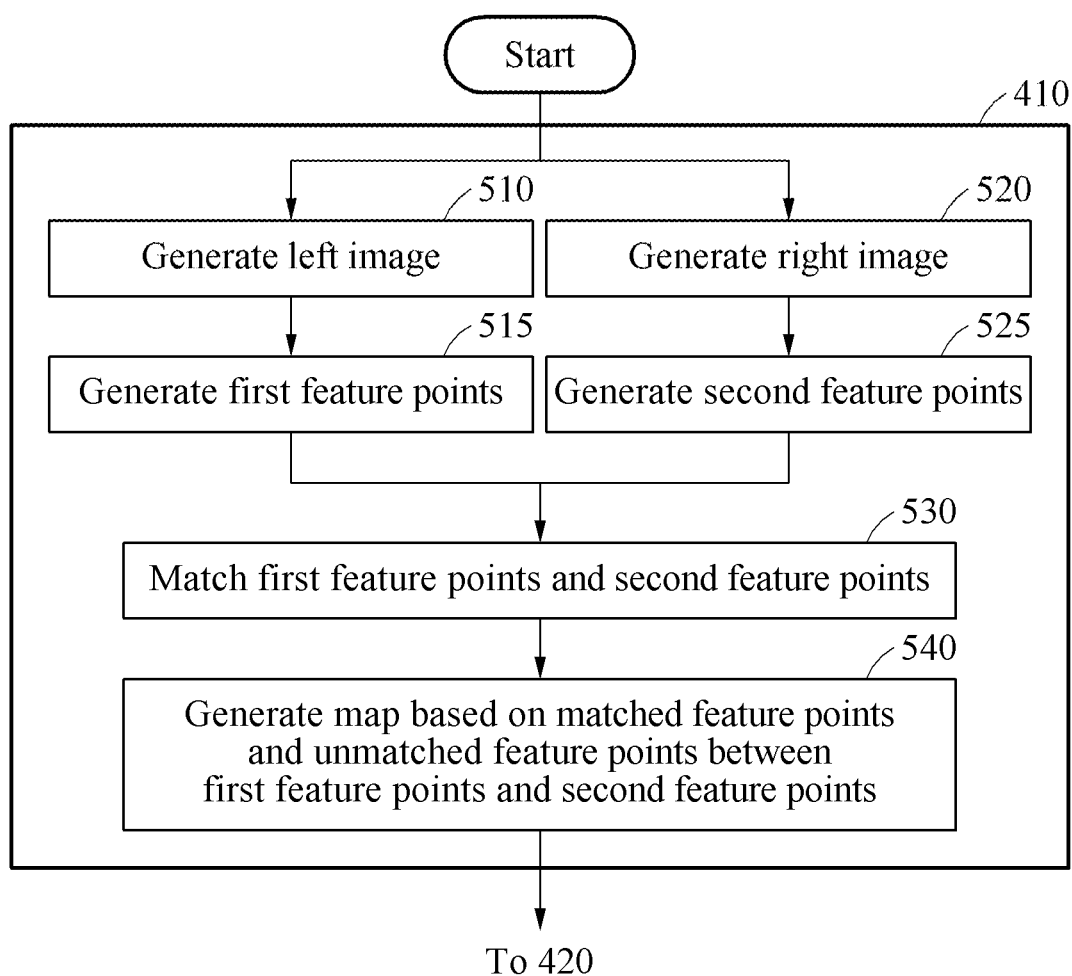
FIG. 5 is a flowchart illustrating an example of a method of generating a map of a space around a device.

FIG. 5 is a flowchart illustrating an example of a method of generating a map of a space around a device.

Operation 410 described above with reference to FIG. 4 may include operations 510 through 540 to be described hereinafter with reference to FIG. 5, although examples are not limited thereto.

Referring to FIG. 5, in operation 510, the device 200 generates a left image. For example, the device 200 may generate the left image using a left camera. For another example, the device 200 may generate the left image by warping a reference image captured using a camera.

In operation 515, the device 200 generates one or more first feature points in the generated left image. Herein, a feature point may indicate an edge in an image and texture of the image. To generate such a feature point, the device 200 may use, as non-limiting examples, a binary robust invariant scalable keypoints (BRISK) method and a scale-invariant feature transform (SIFT) method.

In operation 520, the device 200 generates a right image. For example, the device 200 may generate the right image using a right camera. For another example, the device 200 may generate the right image by warping the reference image captured using the camera.

In operation 525, the device 200 generates one or more second feature points in the generated right image.

In operation 530, the device 200 matches the first feature points and the second feature points. For example, the device 200 may use, as a non-limiting example, a random sample consensus (RANSAC) method, or perform fitting via the RANSAC method, to verify a matching relationship and remove a mismatch.

In operation 540, the device 200 generates a map based on matched feature points and unmatched feature points between the first feature points and the second feature points.

Figure 6:
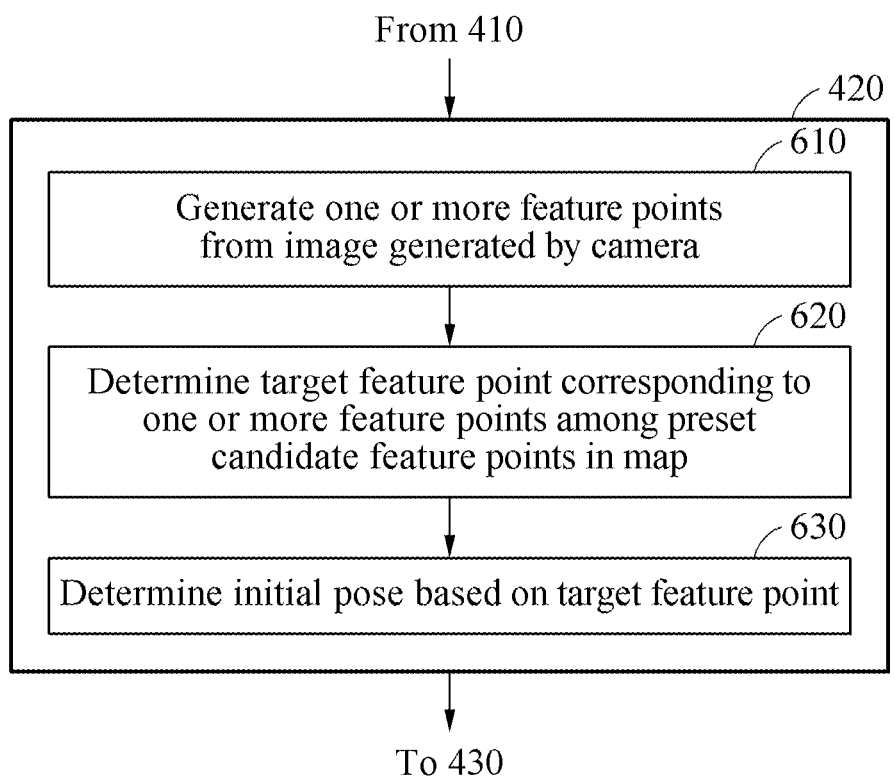
FIG. 6 is a flowchart illustrating an example of a method of determining an initial pose using a map.

FIG. 6 is a flowchart illustrating an example of a method of determining an initial pose using a map, although examples are not limited thereto.

Operation 420 described above with reference to FIG. 4 may include operations 610 through 630 to be described hereinafter with reference to FIG. 6.

Referring to FIG. 6, in operation 610, the device 200 generates one or more feature points from an image generated by a camera.

In operation 620, the device 200 determines a target feature point corresponding to the one or more feature points among candidate feature points preset in a map.

In operation 630, the device 200 determines an initial pose of the device 200 based on the determined target point. For example, the initial pose may be a current pose of the camera 240 or the device 200 that corresponds to a gaze of a user of the device 200. Herein, a pose may indicate a viewpoint of the camera.

While operation 310 of first cluster optimization is being performed repetitively, parameters to be used to estimate a future pose of the device 200 may be optimized. The parameters optimized through operation 310 of the first cluster optimization may also be continuously used in operation 320 of second cluster optimization.

Figure 7:
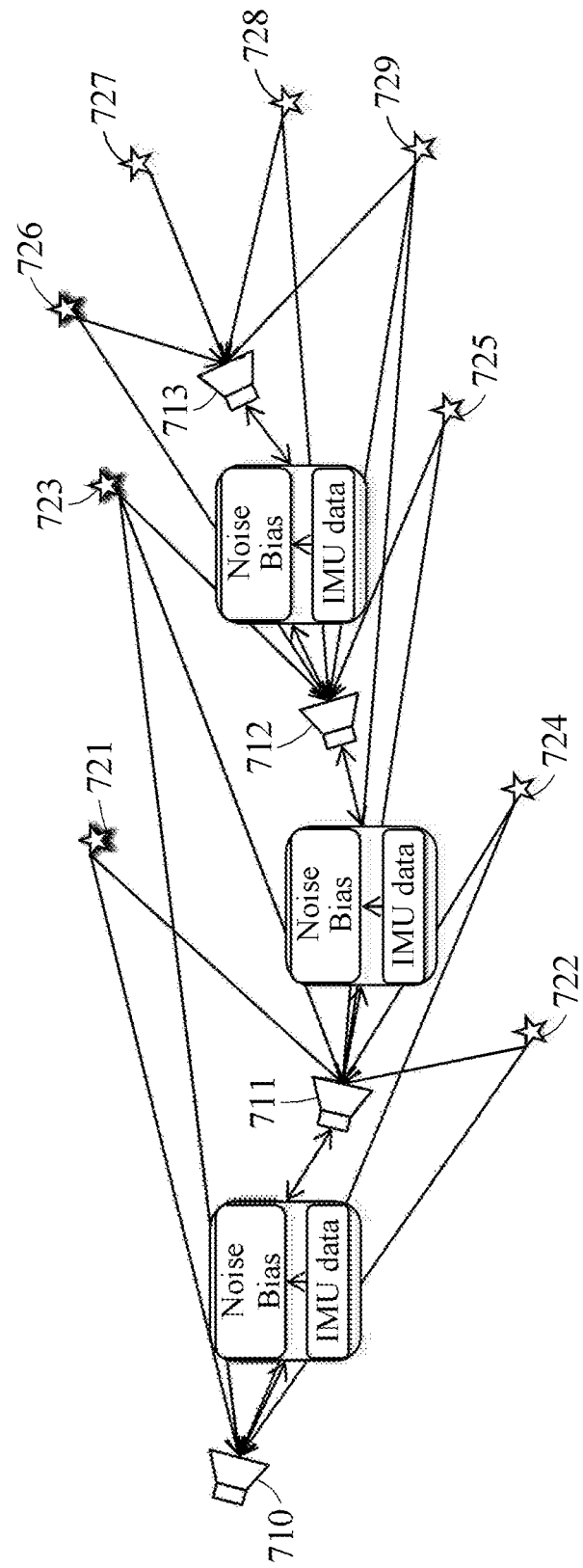
FIG. 7 is a diagram illustrating an example of a cluster optimization method to be performed while an initial pose is being determined.

FIG. 7 is a diagram illustrating an example of a cluster optimization method to be performed while an initial pose is being determined, although examples are not limited thereto.

Referring to FIG. 7, a first pose 710 of the device 200 is determined using an image captured at the first pose 710 and a map. For example, as illustrated, target feature points 721 and 722 of the map are determined based on the image captured at the first pose 710. In this example, a user may move with the device 200 being worn. While the user is moving, a motion state of the device 200 may be detected. Herein, the motion state may indicate IMU data. Based on the determined first pose 710 and the IMU data, a pose of the device 200 subsequent to the first pose 710 is estimated. Herein, to reduce an error in estimating the pose, IMU data from which noise is filtered out may be used. For example, after performing the noise reductions, noise-biased IMU data may be used to estimate the pose.

A second pose 711 of the device 200 is determined using an image captured at the second pose 711 and a map. For example, as illustrated, target feature points 721, 722, 723, 724, and 725 of the map are determined based on the image captured at the second pose 711. Based on the determined second pose 711 and IMU data, a pose of the device 200 subsequent to the second pose 711 is estimated.

A third pose 712 of the device 200 is determined using an image captured at the third pose 712 and a map. For example, as illustrated, target feature points 723, 725, 726, 728, and 729 of the map are determined based on the image captured at the third pose 712. Based on the determined third pose 712 and IMU data, a pose of the device 200 subsequent to the third pose 712 is estimated.

A fourth pose 713 of the device 200 is determined using an image captured at the fourth pose 713 and a map. For example, as illustrated, target feature points 726, 727, 728, and 729 of the map are determined based on the image captured at the fourth pose 713. Based on the determined fourth pose 713 and IMU data, a pose of the device 200 subsequent to the fourth pose 713 is estimated.

The first pose 710, the second pose 711, the third pose 712, and the fourth pose 713 are determined as actual poses, and parameters to be used to estimate a pose may be adjusted based on the actual poses. Herein, an error between an actual pose and an estimated pose may be reduced through repetitive estimation.

Each of the first pose 710, the second pose 711, the third pose 712, and the fourth pose 713 may be an initial pose, and the initial pose may be updated as illustrated for second cluster optimization.

Figure 8:
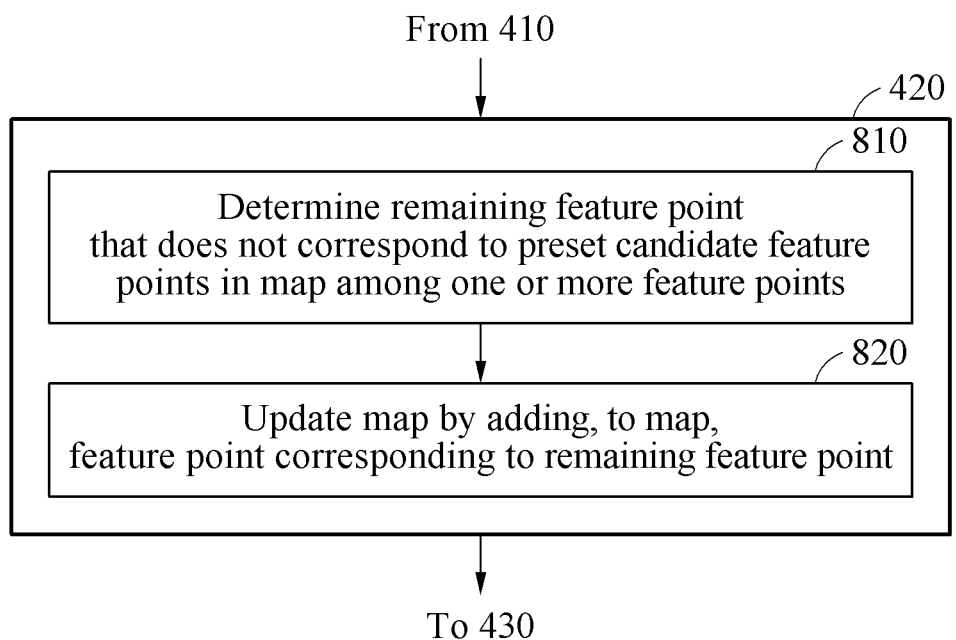
FIG. 8 is a flowchart illustrating an example of a method of updating a map.

FIG. 8 is a flowchart illustrating an example of a method of updating a map.

Operation 420 described above with reference to FIG. 4 may include operations 810 and 820 to be described hereinafter with reference to FIG. 8.

Referring to FIG. 8, in operation 810, the device 200 determines a remaining feature point that does not correspond to preset candidate feature points in a map among one more feature points of a generated image.

In operation 820, the device 200 updates the map by adding, to the map, a feature point corresponding to the remaining feature point. The added feature point may become a candidate feature point. Herein, as the number of candidate feature points increases, the accuracy of a pose of the device 200 to be determined may increase.

Figure 9:
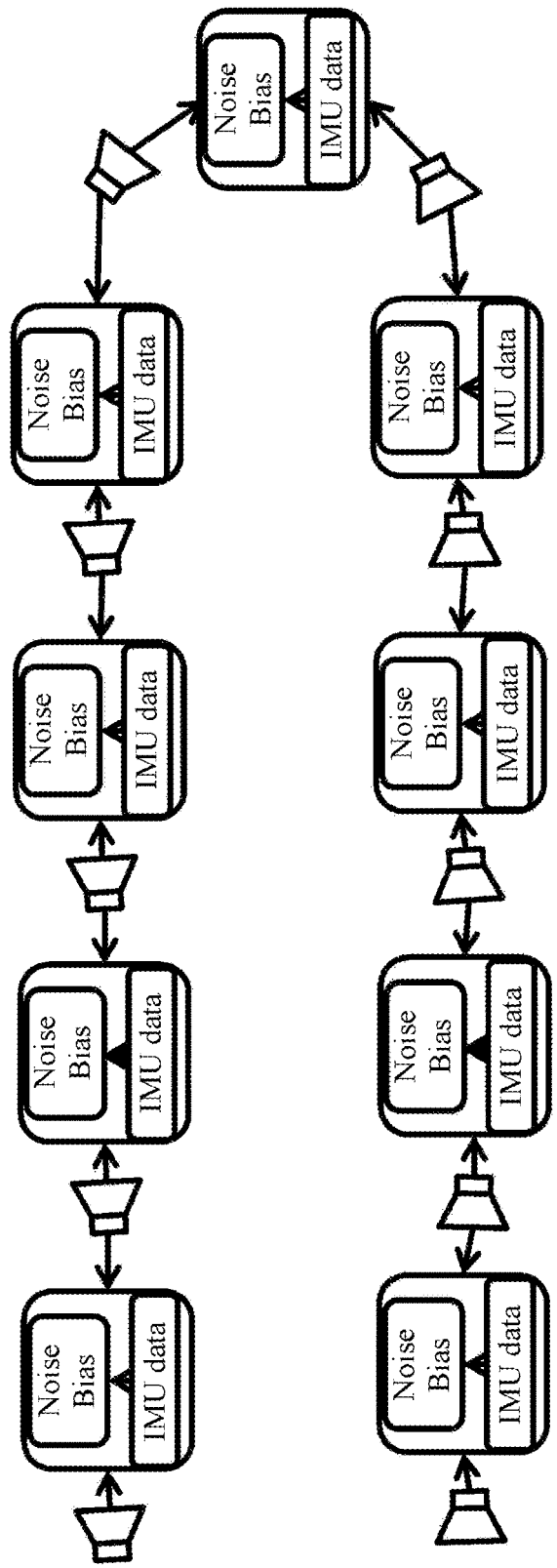
FIG. 9 is a diagram illustrating an example of a second cluster optimization method.

FIG. 9 is a diagram illustrating an example of a second cluster optimization method.

A loose coupling cluster optimization-based second cluster optimization method may be a method of rapidly estimating a pose of the device 200 using data measured by a relatively less number of sensors. For example, a fewer number of sets of data may be used for the second cluster optimization method, than the number of sets of data used for a first cluster optimization method. As the fewer number of sets of data is used, a pose of the device 200 may be rapidly estimated.

In an example, a current pose of the device 200 may be determined using IMU data, and a future pose of the device 200 may be estimated using a history of IMU data. Herein, recurrent detection may be used to reduce a difference between the current pose and the estimated pose.

Hereinafter, a method of estimating a pose of the device 200 using such a loose cluster optimization method will be described in greater detail with reference to FIGS. 10 through 15.

Figure 10:
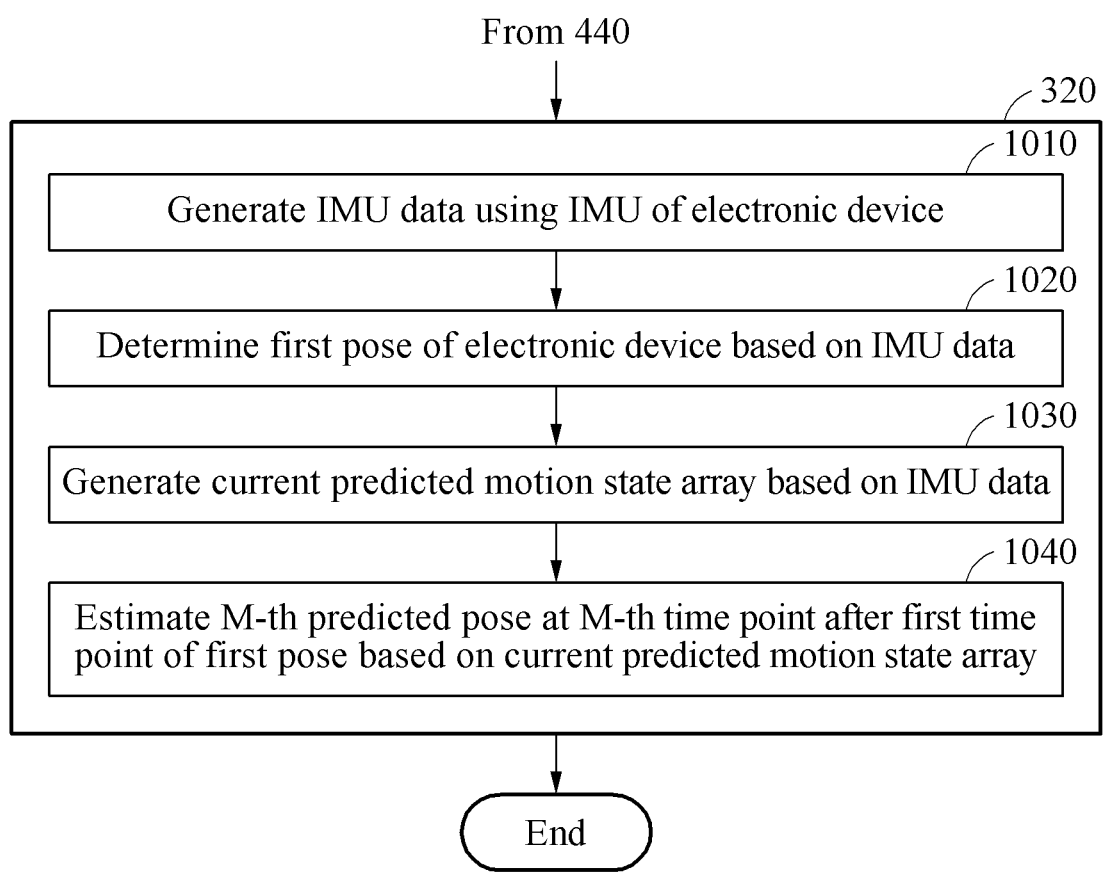
FIG. 10 is a flowchart illustrating an example of a method of estimating an M-th predicted pose through second cluster optimization.

FIG. 10 is a flowchart illustrating an example of a method of estimating an M-th predicted pose through second cluster optimization.

Operation 320 described above with reference to FIG. 3 may include operations 1010 through 1040 to be described hereinafter with reference to FIG. 10. In an example, operation 320 may be performed when the device 200 is in a static state.

Referring to FIG. 10, in operation 1010, the device 200 generates IMU data using the IMU 250.

In operation 1020, the device 200 determines a first pose of the device 200 based on the IMU data. The first pose may be a pose of the device 200 at a current time point, for example, an i-th time.

In an example, the device 200 may determine the first pose based on whether the device 200 is in a static state. For example, when the device 200 is in the static state, the device 200 may determine the first pose using the IMU data.

In operation 1030, the device 200 generates a current predicted motion state array based on the IMU data. Herein, the term "predicted motion state array" refers to an array obtained by arranging, by time point, vectors that predict a motion state of the device 200. The term "current predicted motion state array" refers to an array of predicted motion states that are estimated at a current time point, for example, an i-th time, and the term "previous predicted motion state array" refers to an array of predicted motion states that are estimated at a previous time point, for example, an i−1-th time point. That is, as the previously predicted motion state array is updated, the current predicted motion state array may be generated.

A method of generating the current predicted motion state array will be described in greater detail with reference to FIGS. 11 through 13.

In operation 1040, the device 200 estimates an M-th predicted pose at an M-th time point subsequent to the first pose, based on the current predicted motion state array. Herein, M denotes a natural number greater than 1.

Figure 11:
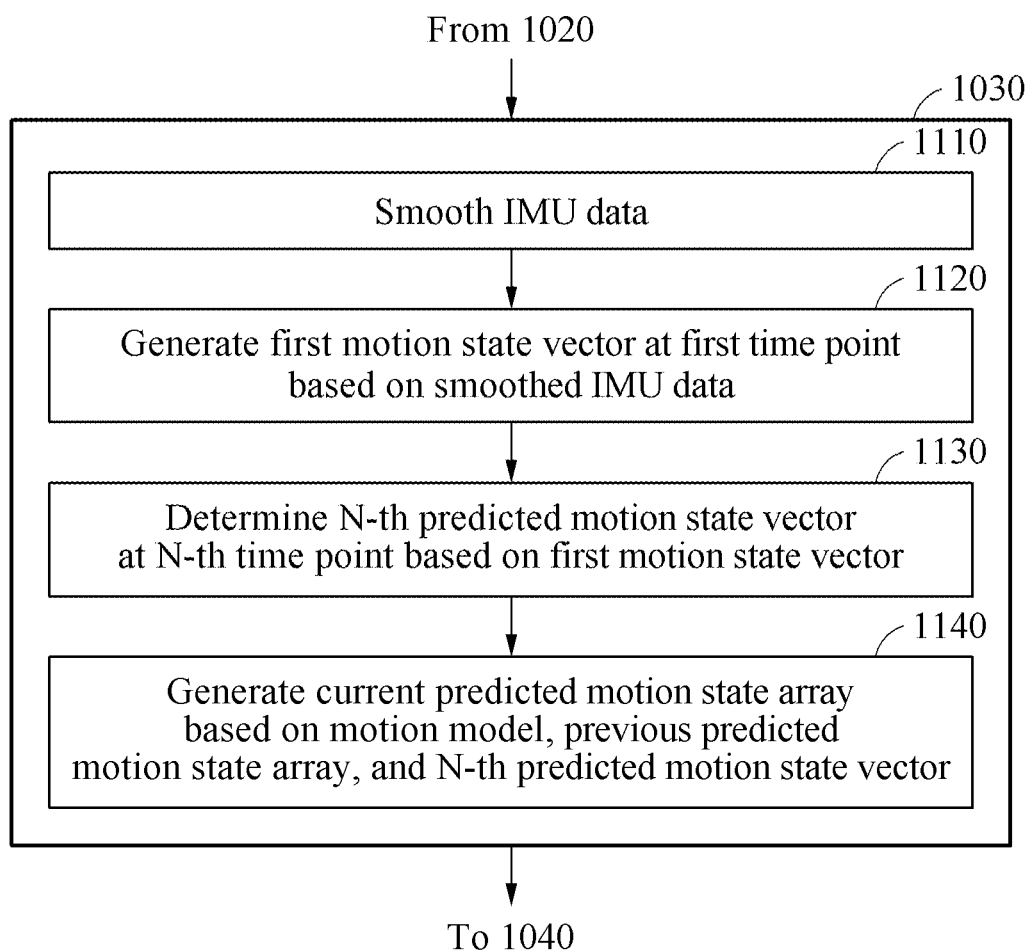
FIG. 11 is a flowchart illustrating an example of a method of generating a current predicted motion state array.

FIG. 11 is a flowchart illustrating an example of a method of generating a current predicted motion state array.

Operation 1030 described above with reference to FIG. 10 may include operations 1110 through 1140 to be described hereinafter with reference to FIG. 11.

Referring to FIG. 11, in operation 1110, the device 200 smoothes measured IMU data to remove noise and outlier data. A Kalman filter, for example, may be used to smooth the IMU data.

In operation 1120, the device 200 generates a first motion state vector at a first time point based on the smoothed IMU data. For example, a motion state vector may be represented by Equation 1.

$$S=\{v, a_v, w, a_w\}$$  Equation 1

In Equation 1, S denotes a motion state vector. $v$ and $a_v$ denote a motion velocity and a motion acceleration, respectively. $w$ and $a_w$ denote a whirl velocity and a whirl acceleration, respectively. The whirl velocity $w$ and the whirl acceleration $a_w$ may be added to indicate respective six-axial directions. In addition, a motion state vector may further include a position of the camera 240.

In an example, the device 200 may generate the first motion state vector by correcting the smoothed IMU data based on a difference between the first pose and a first predicted pose that is estimated in advance. In this example, the difference between the first pose and the first predicted pose may be defined as a compensation amount.

In an example, the device 200 may determine a frequency of generation of the first motion state vector based on at least one of a determined ocular movement velocity of a user or a determined head movement velocity of the user. For example, when a difference occurring due to recurrent detection is to be compensated for, a speed of the compensation may be associated with the ocular movement velocity and/or the head movement velocity. As the head movement velocity increases, the speed of the compensation may also increase.

In operation 1130, the device 200 determines an N-th motion state vector at an N-th time point based on the first motion state vector. For example, the N-th time point may be the furthest point in time from the current time point. In this example, N denotes a natural number greater than M.

As a non-limiting example, the device 200 may generate an N-th predicted motion state vector using a long-short term memory (LSTM)-type recurrent neural network (RNN) using the first motion state vector as input. The RNN may be embodied by a deep learning network.

In operation 1140, the device 200 generates a currently estimated motion state array based on a motion model, a previously estimated motion state array, and the N-th predicted motion state vector. The motion model may include a linear motion model or a nonlinear motion model. A suitable motion model may be selected from among a plurality of motion models based on the generated IMU data.

Figure 12:
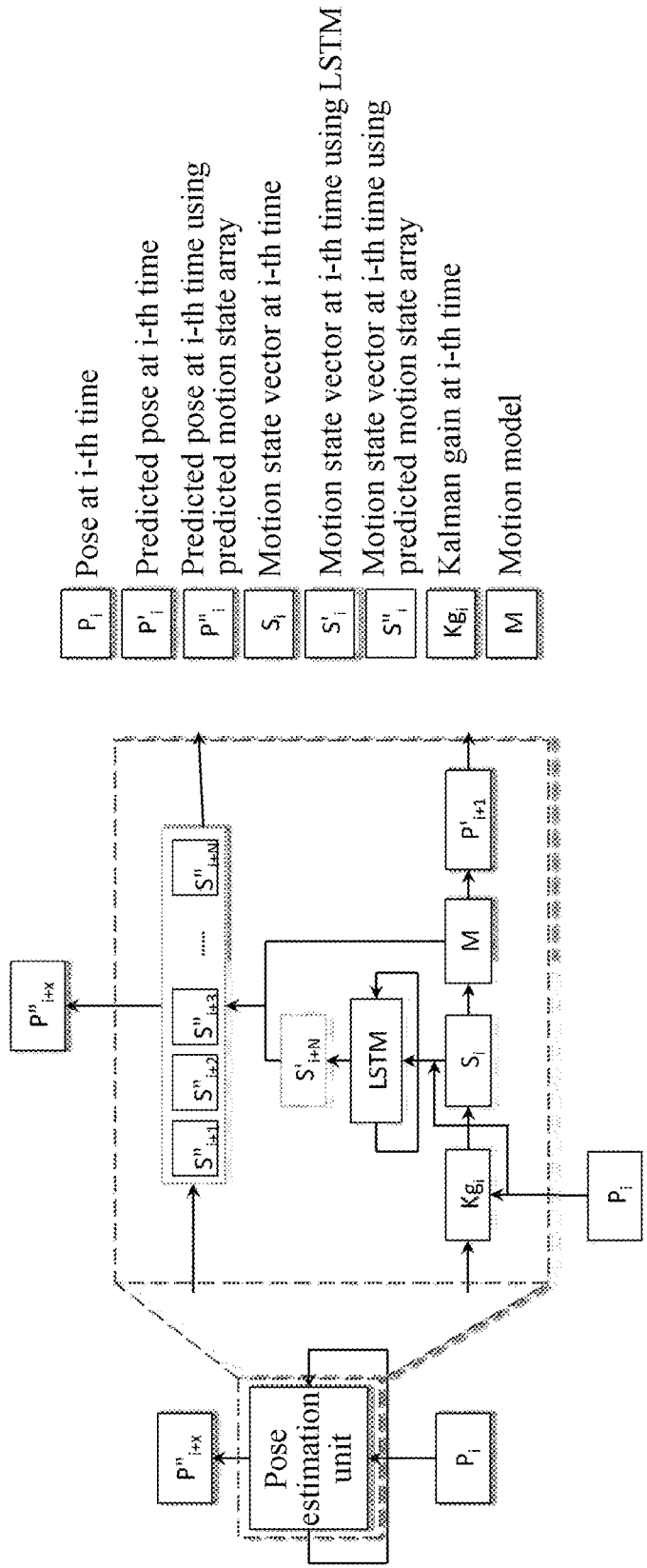
FIG. 12 is a diagram illustrating an example of a method of estimating a pose at an i+x-th time point based on a pose at an i-th time point.

FIG. 12 is a diagram illustrating an example of a method of estimating a pose at an i+x-th time point based on a pose at an i-th time point.

In the example illustrated in FIG. 12, the device 200 may be a pose estimation unit. In a case in which a current time point is an i-th time point, a determined pose $P_i$ at the i-th time point may be an input to the pose estimation unit, and an output of the pose estimation unit may be a predicted pose $P'''_{i+x}$ at an i+x-th time point using a predicted motion state array.

Herein, the pose estimation unit be representative of one or more processors of the device 200, or may be representative of being implemented by a same one or more processors of the device 200 as implementing one or more or any combination of other operations. For example, each such one or more processors may be implemented through hardware only, e.g., through specialized circuitry, or through a combination of such hardware and instructions, such that when a corresponding processor executes such instructions, the processor is caused to perform the described operations. Thus examples, exist the pose estimation unit is implemented through hardware only, and examples exist where the pose estimation unit is implemented through the combination of hardware and instructions. Thus, as described herein, one or more processors configured to implement or perform the respective operations of the pose estimation unit is inclusive of all such examples of such hardware and/or hardware/instruction implementations.

IMU data may be generated repetitively and continuously until the i+x-th time point, and thus the predicted pose $P'''_{i+x}$ at the i+x-th time point may be continuously updated through recurrent detection until the i+x-th time point is reached.

A further detailed operation of the pose estimation unit is as follows:

A difference between the pose $P_i$ at the i-th time point determined based on the IMU data and a predicted pose $P'_i$ at the i-th time point is calculated as an error. The error may be used to adjust a motion state vector $S_i$ at the i-th time point. Herein, a Kalman gain $Kg_i$ may be used, as needed, to additionally adjust the motion state vector $S_i$.

A predicted pose $P'_{i+1}$ at an i+1-th time point is calculated based on the motion state vector $S_i$ at the i-th time point and a motion model M. The predicted pose at the i+1-th time point may be an input to the pose estimation unit at the i+1-th time point.

An i+N−1-th predicted motion state vector $S'_{i+N-1}$ at an i+N−1-th time point is generated using an LSTM-type RNN which uses the motion state vector $S_i$ as an input. Although a motion state vector is used in the example illustrated in FIG. 12, examples are not limited to the example described in the foregoing and other information indicating a state of the device 200 may also be used in other examples.

For example, the i+N−1-th predicted motion state vector $S'_{i+N-1}$ may be calculated as represented by Equation 2.

$$S'_{i+N-1} = \{v'_{i+N-1}, a'_{v,i+N-1}, w'_{i+N-1}, a'_{w,i+N-1}\}$$

$$v'_{i+N-1} = v_i + a_{v,i} \cdot (N-1 \cdot \Delta t)$$

$$a'_{v,i+N-1} = a_{v,i}$$

$$w'_{i+N-1} = w_i \oplus a_w \cdot (N-1 \cdot \Delta t).$$

$$a'_{w,i+N-1} = a_{w,i} \qquad \text{Equation 2}$$

vi) A current predicted motion state array is generated based on a motion model M, a previously predicted motion state array, and the i+N−1-th predicted motion state vector $S'_{i+N-1}$.

When a current time point changes to an i+1-th time point, a predicted pose $P'_{i+1}$ at the i+1-th time point and a current predicted motion state array that is calculated previously may be recurrently inputted to the pose estimation unit as a previously predicted motion state array. The operations described in the foregoing may be recurrently performed until a current time point reaches an i+x-th time point. Such a recurrent method may be used to reduce an error between a predicted pose at the i+x-th time point and a predicted pose at the i+x-th time point that is determined using IMU data.

Figure 13:
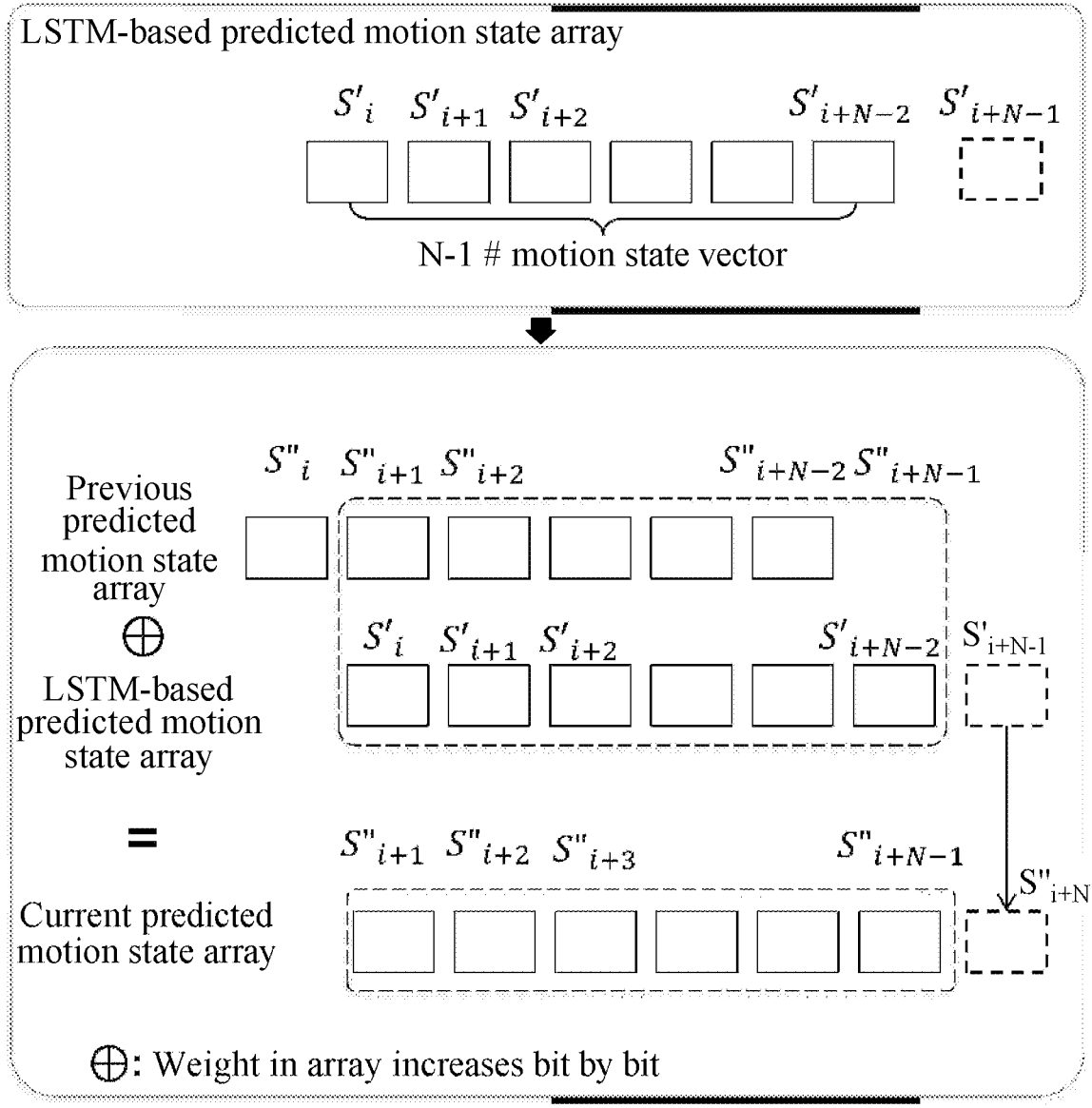
FIG. 13 is a diagram illustrating an example of a method of calculating a current predicted motion state array.

FIG. 13 is a diagram illustrating an example of a method of calculating a current predicted motion state array.

Referring to FIG. 13, an i+N−1-th predicted motion state vector $S'_{i+N-1}$ that is generated using an LSTM method may be added to an LSTM-based predicted motion state array. For example, the LSTM-based predicted motion state array may include N sets of data, and the latest data may be added thereto based on a first in first out (FIFO) method. The LSTM-based predicted motion state array may be a motion state sliding window.

A current predicted motion state array may be calculated based on a previously predicted motion state array that is calculated at a previous time point, or an i−1-th time point, which is a current predicted motion state array at the i−1-th time point, and on the LSTM-based predicted motion state array. For example, by combining the previously predicted motion state array and the LSTM-based predicted motion state array, the current predicted motion state array may be calculated. Herein, a greater weight may be applied to a more recently predicted motion state vector.

Based on the generated current predicted motion state array, a predicted pose $P''_{i+x}$ at an i+x-th time point may be generated. For example, the predicted pose $P''_{i+x}$ at the i+x-th time point may be calculated as represented by Equation 3.

$$P''_{i+x} = \sum_{k=0}^{[x]} \int_0^{\Delta t} S''_{i+k+1} dt + \int_{[x]}^{x} S''_{i+[x]+1} dt \qquad \text{Equation 3}$$

Figure 14:
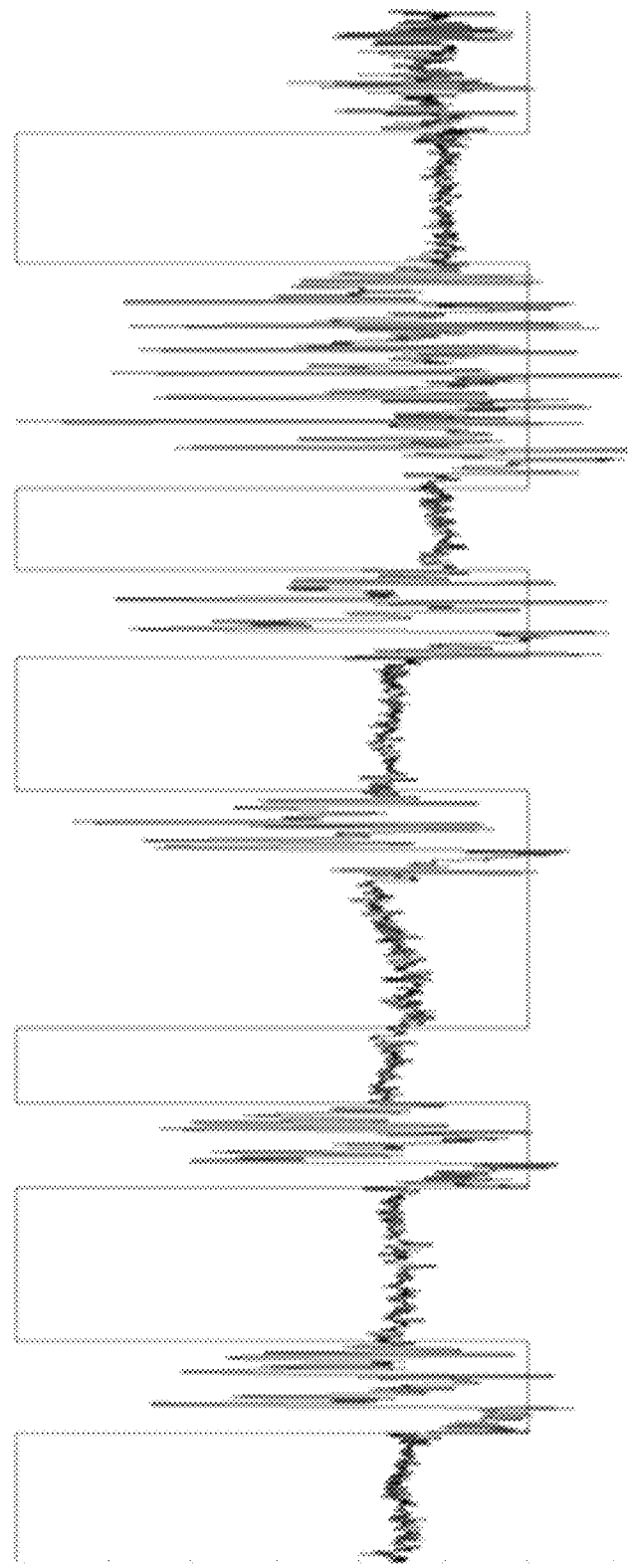
FIG. 14 is a diagram illustrating an example of a method of detecting a static state.

FIG. 14 is a diagram illustrating an example of a method of detecting a static state.

In the example illustrated in FIG. 14, a bold line indicates a variance change curve of IMU data when a user walks. A variance of the IMU data may periodically change due to the repetitiveness of the walking of the user. When a local variance of the IMU data, or a variance in a time window, is less than a predicted threshold value, it may correspond to a phase at which a foot of the user touches the ground in response to a center of mass, and the phase may be a zero-speed interval. In an example, such a zero-speed interval may be extracted using a threshold value during a movement of the device 200, and this interval may be applied as a constraint on cluster optimization.

Figure 15:
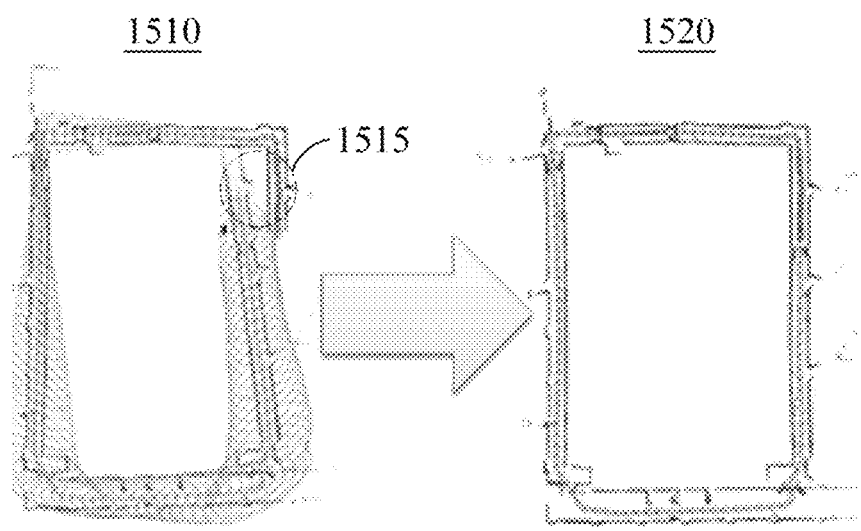
FIG. 15 is a diagram illustrating an example of a result from a jitter generated by recurrent detection.

FIG. 15 is a diagram illustrating an example of a result from a jitter generated by recurrent detection.

In addition to an IMU integration error that may cause a difference between poses, such a difference between poses may also be generated by recurrent detection of the same map. The example illustrated in FIG. 15 indicates a scene in which jitter is generated due to recurrent detection.

When the device 200 reaches a previously passed position after turning a full circle, there may be a deviation between a previously stored map point and a recently stored map point. Herein, there may need to update a position of a current map point using a recurrent detection function. That is, there may need to correct both a pose difference resulted from the presence of an error in an IMU integration and a pose difference resulted from recurrence.

An inverse relationship may be established between a velocity of a motion of an object that is projected onto a retina and a sensitivity of a human eye to the motion of the object. Thus, by detecting an ocular movement velocity $H_S$ and a motion velocity P of a virtual object, a human sensing speed $H_T$, which is a speed at which a human being senses the motion, may be calculated. Using the human sensing speed $H_T$, a speed at which a bias decreases may be determined. Herein, the greater the human sensing speed $H_T$, the faster the reduction in the bias. The human sensing speed $H_T$ may be calculated as represented by Equation 4.

$$H_T = \frac{H_S}{\tilde{r}(f_T)} + P\left[1 - \frac{\tilde{e}}{\tilde{r}(f_T)}\right] \qquad \text{Equation 4}$$

In Equation 4, $\tilde{e}$ may be 0.6 in most cases. $f_T$ denotes a size of an object, and $\tilde{r}(f_T)$ denotes a size of the object that is projected onto a retina.

Figure 16:
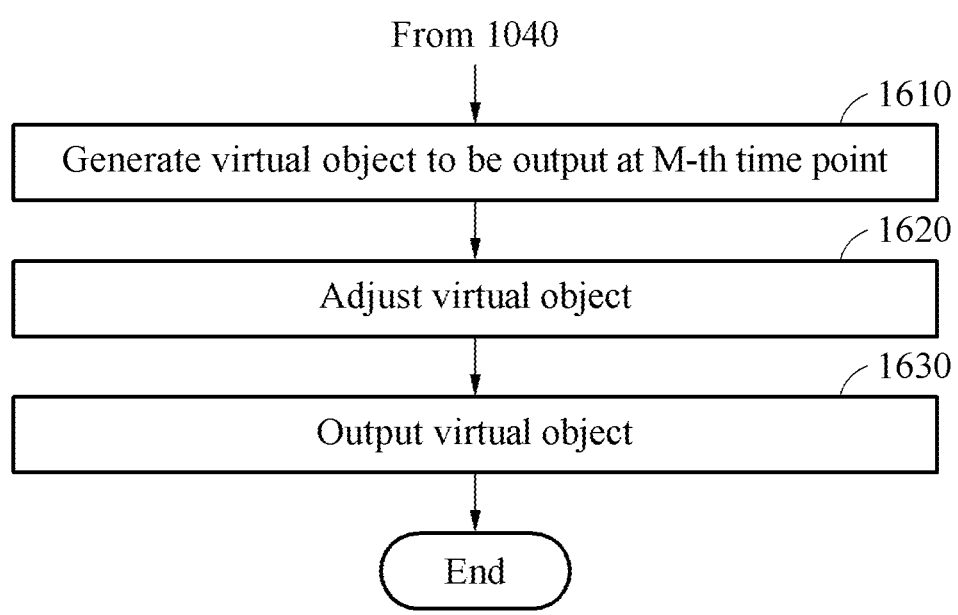
FIG. 16 is a flowchart illustrating an example of a method of outputting a virtual object.

FIG. 16 is a flowchart illustrating an example of a method of outputting a virtual object.

In an AR system or a VR system, it may need to determine a pose of the device 200 at a current time point using simultaneous localization and mapping (SLAM) method and then generate a virtual object based on the determined pose of the device 200. In addition, the generated virtual object may be output or displayed by superimposing the generated virtual object on a real object. Herein, when the generating of the virtual object is complicated or includes illumination calculation, a certain amount of time may be used to generate the virtual object. This may induce a delay in the outputting of the virtual object, and affect an AR or VR effect. Hereinafter, an image outputting method that may reduce such a delay will be described.

Operations 1610 through 1630 to be described hereinafter with reference to FIG. 16 may be performed after operation 1040 described above with reference to FIG. 10 is performed, although examples are not limited thereto.

Referring to FIG. 16, in operation 1610, the device 200 generates a virtual object to be output at an M-th time point. The virtual object may be, for example, a holographic image or a hologram.

Herein, a holographic image and a depth image that are generated for a previous image may be used to generate a new holographic image. Since depth information of each point of the previous image and a pose of the device 200 corresponding to the holographic images of the two images are previously known information, a position of a pixel of the previous image corresponding to a pixel of an image to be generated may be calculated. The pixel of the previous image may be copied to the corresponding pixel of the image to be generated. Such a method may reduce an amount of calculation or computation to be processed, and may thus reduce an amount of time used to generate a virtual object.

In operation 1620, the device 200 adjusts the virtual object.

The device 200 may obtain a pose change occurring while rendering the virtual object and adjust the virtual object to correspond to the obtained pose change.

The virtual object may be output at the M-th time point. Herein, when a frequency at which IMU data is generated is greater than a frequency at which the virtual object is output, sets of IMU data may be generated at time points among time points at which the virtual object is output. For example, a motion state of the device 200 at a first time point and a motion state of the device 200 at the M-th time point may be obtained by integrating the sets of IMU data. The pose change may be obtained based on the obtained motion states, and the virtual object may be adjusted based on the obtained pose change.

In operation 1630, the device 200 outputs the virtual object. For example, the device 200 may generate an image with respect to the M-th time point, and output the virtual object such that the generated image and the virtual object are synthesized. For another example, the device 200 may output only the virtual object.

Figure 17:
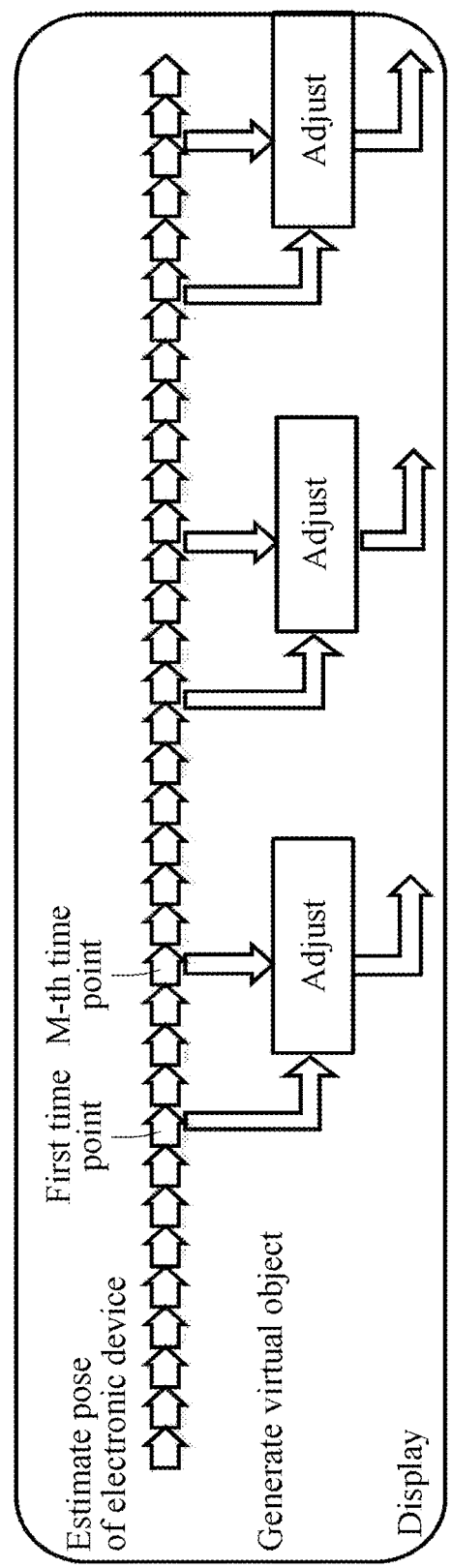
FIG. 17 is a diagram illustrating an example of a method of outputting a synthesized image based on an estimated pose of a device.

FIG. 17 is a diagram illustrating an example of a method of outputting a synthesized image based on an estimated pose of a device.

Referring to FIG. 17, a pose of the device 200 from a first time point to an M-th time point may be estimated. A virtual object to be output at the M-th time point from a time point at which the pose of the device 200 at the M-th time point is estimated may be generated or rendered.

Herein, sets of IMU data may be obtained at time points between the first time point and the M-th time point, and a pose of the device 200 at the M-th time point may be continuously re-estimated based on the obtained sets of IMU data. The virtual object may be adjusted to correspond to the re-estimated pose of the device 200. The virtual object may be displayed at the M-th time point.

Figure 18:
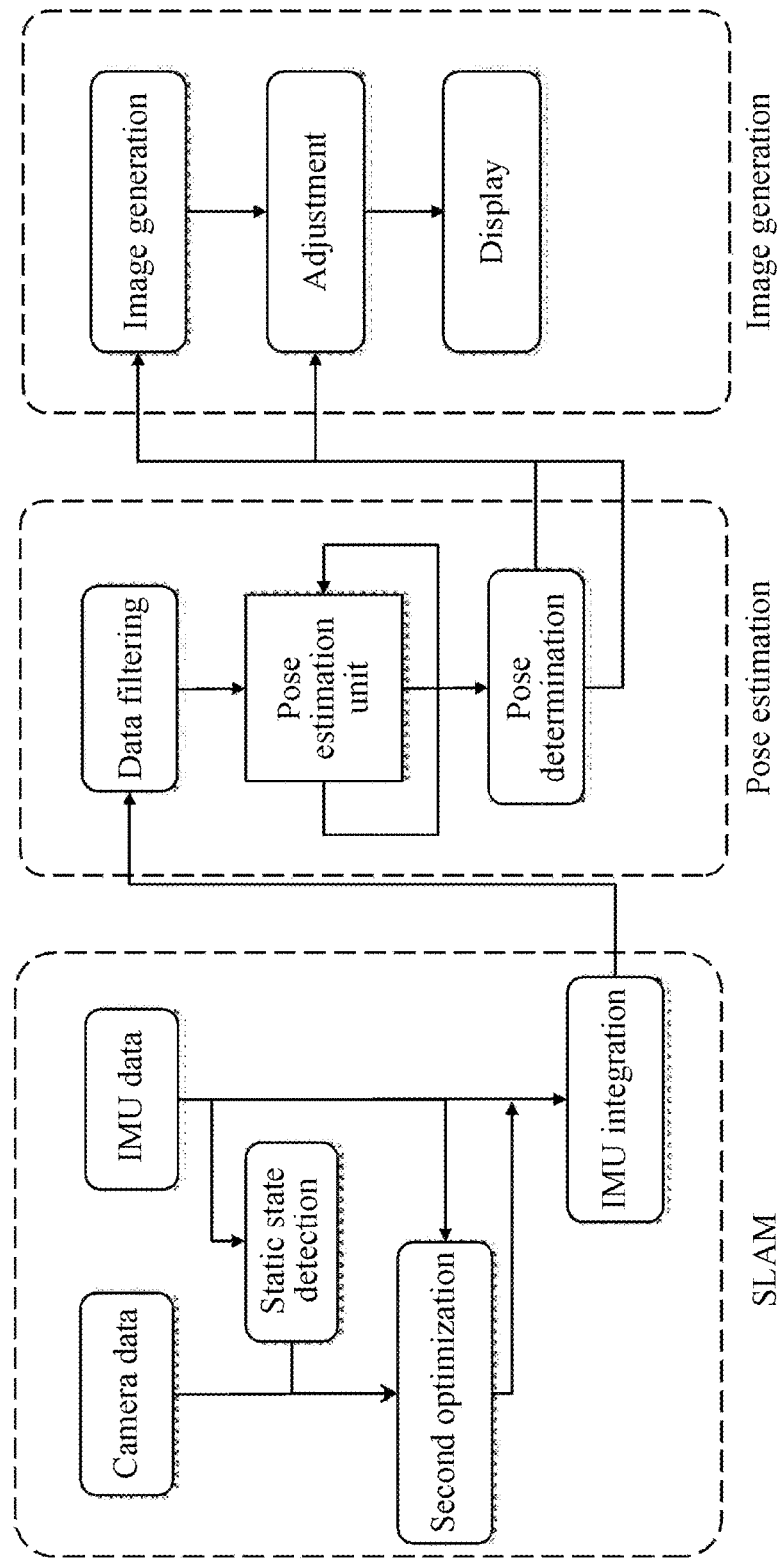
FIG. 18 is a diagram illustrating an example of a module configuration of a device.

FIG. 18 is a diagram illustrating an example of a module configuration of a device. Referring to FIG. 18, the device 200 includes a SLAM module, a pose estimation module, and an image generation module. The SLAM module may use a fusion of a plurality of sensors and be configured to generate a current pose of the device 200 at a high frame rate. The pose estimation module may be configured to estimate a future pose of the device 200 based on an output of the SLAM module and data filtering. The image generation module may be configured to adjust a virtual object or an image generated based on a pose change of the device 200 while the virtual object is being generated. Herein, the SLAM module, pose estimation module, and the image generation module may each be representative of respective one or more processors of the device 200, representative of being implemented by a same one or more processors of the device 200, or representative of the corresponding operations being respectively implemented in various combinations by two or more processors of the device 200. For example, each such one or more processors may be implemented through hardware only, e.g., through specialized circuitry, or through a combination of such hardware and instructions, such that when a corresponding processor executes such instructions, the processor is caused to perform the described operations. Thus examples, exist where each of the SLAM module, pose estimation module, and the image generation module are implemented through hardware only, and examples exist where each of the SLAM module, pose estimation module, and the image generation module are implemented through the combination of hardware and instructions. Also, in an example, less than all of the SLAM module, pose estimation module, and the image generation module may be implemented through the example combination of hardware and instructions, with the remaining SLAM module, pose estimation module, and the image generation module being implemented by hardware alone. Thus, as described herein, one or more processors configured to implement or perform the respective operations of the SLAM module, pose estimation module, and the image generation module is inclusive of all such examples of such hardware and/or hardware/instruction implementations.

Figure 19:
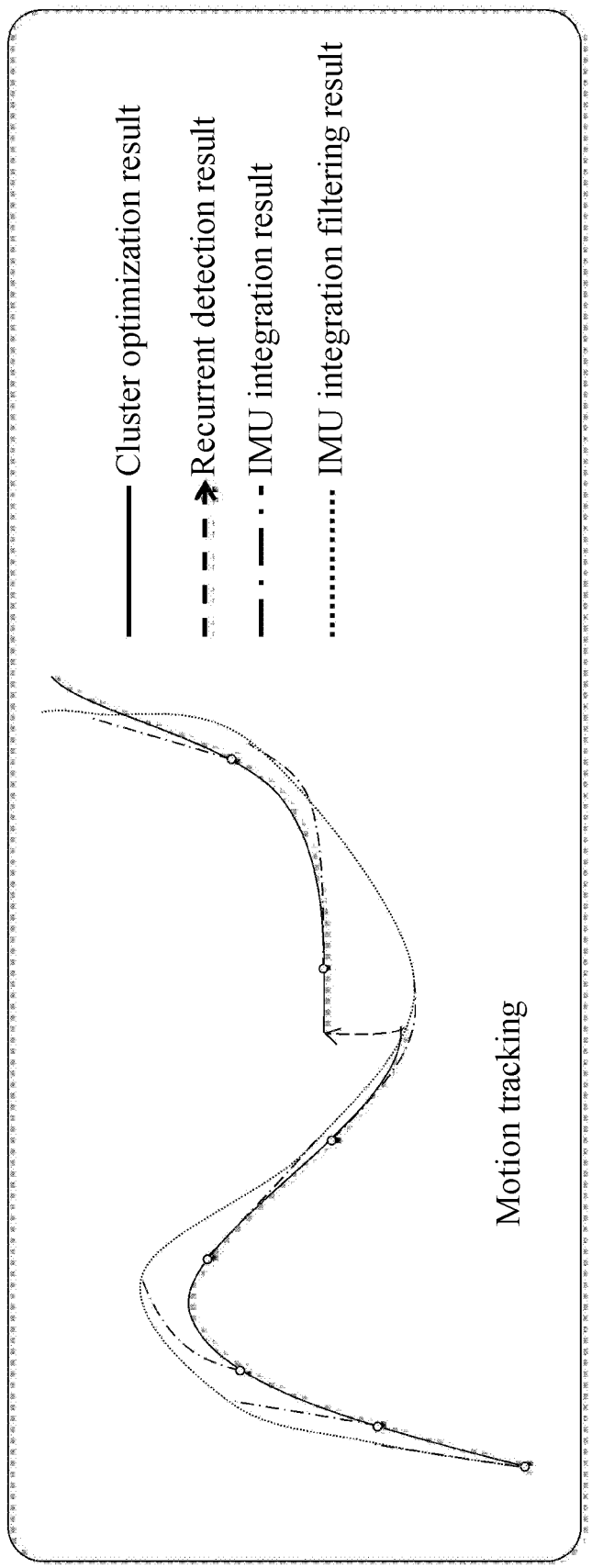
FIG. 19 is a diagram illustrating examples of pose estimation results from various detection methods.

FIG. 19 is a diagram illustrating examples of pose estimation results from various detection methods.

Referring to FIG. 19, a method using IMU integration filtering may have a most smoothed estimation result among pose estimation results from various detection methods. When first cluster optimization and second cluster optimization are successively performed, it is possible to prevent estimation of a rapid pose change of the device 200 through IMU data integration and filtering used to remove noise.

The device 200, communicator 210, the processor 220, the memory 230, the camera 240, the IMU 250, the SLAM module, the pose estimation module, the image generation module, and pose estimation unit are implemented by hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-19 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control a processor or computer to implement the hardware components and perform the methods as described above are written as computer programs, code segments, instructions or any combination thereof, for individually or collectively instructing or configuring the processor or computer to operate as a machine or special-purpose computer to perform the operations performed by the hardware components and the methods as described above. In one example, the instructions or software include machine code that is directly executed by the processor or computer, such as machine code produced by a compiler. In another example, the instructions or software include higher-level code that is executed by the processor or computer using an interpreter. Programmers of ordinary skill in the art can readily write the instructions or software based on the block diagrams and the flow charts illustrated in the drawings and the corresponding descriptions in the specification, which disclose algorithms for performing the operations performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, nonvolatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A processor-implemented method of a device estimating a pose of the device, the method comprising:
    generating, using an inertial measurement unit (IMU) of the device, IMU data;
    determining a first pose of the device a first time point based on the IMU data;
    generating a current predicted motion state array based on the IMU data; and
    estimating an M-th predicted pose of the device at an M-th time point after the first time point based on the current predicted motion state array,
    wherein M denotes a natural number greater than 1, wherein the generating of the current predicted motion state array comprises:
  smoothing the IMU data;
  generating a first motion state vector at the first time point based on the smoothed IMU data;
  determining an N-th predicted motion state vector at an N-th time point based on the first motion state vector, wherein N denotes a natural number greater than M; and
  generating the current predicted motion state array based on a motion model, a previous predicted motion state array, and the N-th predicted motion state vector.

2. The method of claim 1, wherein the generating of the first motion state vector comprises:
  generating the first motion state vector by correcting the smoothed IMU data based on a difference between the first pose and a first predicted pose that is estimated in advance.

3. The method of claim 1, wherein the determining of the N-th predicted motion state vector comprises:
  generating the N-th predicted motion state vector using a long-short term memory (LSTM) recurrent neural network (RNN) using the first motion state vector as an input.

4. The method of claim 1, wherein the generating of the first motion state vector comprises:
  determining a frequency of generation of the first motion state vector based on at least one of an ocular movement velocity of a user of the device or a head movement velocity of the user.

5. The method of claim 1, further comprising:
determining whether the device is in a static state based on the IMU data,
  wherein the determining of the first pose of the device comprises:
  determining the first pose based on whether the device is in the static state.

6. The method of claim 1, further comprising:
  generating a virtual object to be output at the M-th time point; and
  outputting the virtual object.

7. The method of claim 6, further comprising:
  adjusting the virtual object based on a pose change of the device occurring during a period for rendering of the virtual object.

8. The method of claim 6, wherein the outputting of the virtual object comprises:
  outputting the virtual object such that an image at the M-th time point and the virtual object are synthesized.

9. The method of claim 6, wherein the virtual object is a holographic image.

10. The method of claim 1, further comprising:
  generating a map of a space around the device;
  determining an initial pose of the device using the generated map; and
  determining whether the device is in a static state based on the IMU data,
    wherein the first pose is determined when the device is in the static state.

11. The method of claim 10, wherein the generating of the map comprises:
  generating a left image using a left camera of the device;
  generating one or more first feature points from the left image;
  generating a right image using a right camera of the device;
  generating one or more second feature points from the right image;
  matching the first feature points and the second feature points; and
  generating the map based on matched feature points and unmatched feature points between the first feature points and the second feature points.

12. The method of claim 10, wherein the determining of the initial pose comprises:
  generating one or more feature points from an image generated by at least one of a left camera or a right camera of the device;
  determining a target feature point corresponding to the one or more feature points among preset candidate feature points in the map; and
  determining the initial pose based on the target feature point.

13. The method of claim 12, wherein the determining of the initial pose further comprises:
  determining a remaining feature point that does not correspond to the preset candidate feature points in the map among the one or more feature points; and
  updating the map by adding, to the map, a feature point corresponding to the remaining feature point.

14. The method of claim 1, wherein the device is a wearable device.

15. A non-transitory computer-readable storage medium storing instructions that, when executed by a processor, cause the processor to perform the method of claim 1.

16. A device for estimating a pose of the device, comprising:
  at least one camera;
  an inertial measurement unit (IMU); and
  a processor configured to:
    generate IMU data using the IMU of the device;
    determine a first pose of the device based on the IMU data;
    generate a current predicted motion state array based on the IMU data; and
    estimate an M-th predicted pose at an M-th time point after a first time point of the first pose based on the current predicted motion state array, wherein M denotes a natural number greater than 1,
  wherein the processor is configured to generate the current predicted motion state array by:
    smoothing the IMU data;
    generating a first motion state vector at the first time point based on the smoothed IMU data;
    determining an N-th predicted motion state vector at an N-th time point based on the first motion state vector, wherein N denotes a natural number greater than M; and
    generating the current predicted motion state array based on a motion model, a previous predicted motion state array, and the N-th predicted motion state vector.

17. The device of claim 16, further comprising a memory storing instructions, which when executed by the processor, configure the processor to perform the generation of the IMU data, the determination of the first pose, the generation of the current predicted motion state array and the estimation of the M-th predicted pose.

18. A processor-implemented method, the method comprising:
  determining a first pose of a device based on an inertial measurement unit (IMU) data at a first time point;

generating a current predicted motion state array based on the IMU data;
estimating a second pose of the device at a second time point after the first time point based on the current predicted motion state array;
generating a virtual object to be output at the second time point;
adjusting the virtual object based on a pose change of the device occurring during a period for rendering of the virtual object; and
outputting the virtual object.

19. The method of claim 18, wherein the generating of the current predicted motion state array comprises:
generating a first motion state vector at the first time point based on the IMU data;
determining a predicted motion state vector at a third time point based on the first motion state vector; and
generating the current predicted motion state array based on a motion model, a previous predicted motion state array, and the predicted motion state vector.

* * * * *